United States Patent [19]
Hoffman et al.

[11] Patent Number: 5,949,330
[45] Date of Patent: Sep. 7, 1999

[54] METHOD AND APPARATUS FOR DISPLAYING SENSOR OUTPUTS IN A DIAGNOSTIC SYSTEM

[75] Inventors: John P. Hoffman, Peoria; Ricky D. Vance, Washington; Dennis A. Barney, Morton, all of Ill.

[73] Assignee: Caterpillar Inc., Peoria, Ill.

[21] Appl. No.: 08/150,755

[22] Filed: Nov. 12, 1993

Related U.S. Application Data

[63] Continuation of application No. 07/945,471, Sep. 16, 1992, abandoned.

[51] Int. Cl.$^6$ .............................. B60Q 1/00; G08B 25/00
[52] U.S. Cl. ........................ 340/438; 340/459; 340/461; 340/462; 340/525; 701/29
[58] Field of Search ................................... 340/438, 459, 340/461, 462, 525; 701/29

[56] References Cited

U.S. PATENT DOCUMENTS

| | | | |
|---|---|---|---|
| 3,516,063 | 6/1970 | Arkin et al. | 340/505 |
| 3,866,166 | 2/1975 | Kerscher, III et al. | 340/462 |
| 3,906,437 | 9/1975 | Brandwien et al. | 340/945 |
| 4,223,302 | 9/1980 | Hocking | 340/525 |
| 4,287,504 | 9/1981 | Simon et al. | 340/462 |
| 4,551,801 | 11/1985 | Sokol | 701/32 |
| 4,748,843 | 6/1988 | Schafer et al. | 73/117.3 |
| 4,843,557 | 6/1989 | Ina et al. | 701/114 |
| 4,926,331 | 5/1990 | Windle et al. | 701/35 |
| 4,939,652 | 7/1990 | Steiner | 701/35 |
| 4,967,143 | 10/1990 | Raviglione et al. | 324/73.1 |
| 4,975,848 | 12/1990 | Abe et al. | 701/32 |
| 4,977,389 | 12/1990 | Shiraishi | 340/461 |
| 5,019,799 | 5/1991 | Oshiage et al. | 340/438 |
| 5,150,609 | 9/1992 | Ebner et al. | 73/117.3 |

FOREIGN PATENT DOCUMENTS

| | | |
|---|---|---|
| 3837 592 A1 | 10/1990 | Germany . |
| WO 89/11279 | 12/1989 | WIPO . |
| WO 92/04693 | 3/1992 | WIPO . |

OTHER PUBLICATIONS

Caterpillar Service Manual—"Computerized Monitoring System With LCD Bargraph Gauges", published Jan. 1991.
Journal Article—"Microelectronics takes to the road in a big way: a special report", pp. 113–122 in the Nov. 20, 1980 edition of Electronics.
Journal Article entitled "All on board with O & K" believed to have been published Jan. 1990.
Publication entitled Introducing the Vital Signs Monitor plus Load Weighing System, by Marathon LeTrouneau, published Jan. 1988.
Caterpillar Service Manual—"Systems Operation Testing and Adjusting—Computerized Monitoring System with Liquid Crystal Display" published on or about Oct. 1990.

Primary Examiner—Donnie L. Crosland
Attorney, Agent, or Firm—David M. Masterson

[57] ABSTRACT

Systems for monitoring sensed parameters and diagnosing fault conditions are useful in connection with many machines. Advantageously, such systems are capable of indicating the level of the sensed parameters in both a graphical and a digital format. In the subject invention, a switch selects one of a normal mode and a numeric readout mode. A sensor produces a sensor signal. A device displays a number in digital form that is representative of the sensor signal in response to the switch selecting the numeric readout mode. A gauge is provided to display the sensor signal in graphical form in response to the switch selecting the normal mode and to flash an illuminable device in response to the switch selecting the numeric readout mode.

15 Claims, 4 Drawing Sheets

METHOD AND APPARATUS FOR DISPLAYING SENSOR OUTPUTS IN A DIAGNOSTIC SYSTEM

This is a continuation of application Ser. No. 07/945,471, filed Sep. 16, 1992, now abandoned.

TECHNICAL FIELD

This invention relates generally to the display of the level of sensed parameters and, more particularly, to a method and apparatus for indicating which of a plurality of parameters is being displayed in a digital format.

BACKGROUND ART

Today's machines, and particularly work vehicles, are becoming increasingly complex in their design thus making it more and more difficult for service personnel to locate defects in machine sensors and systems. In particular, it is sometimes difficult to determine whether a sensor is producing a signal that is truly representative of the actual level of the sensed parameter. This often results in technicians spending time replacing sensors that actually are producing accurate signals which tends to increase the time required, and thus the cost, for repairs.

It is therefore advantageous to determine whether the sensor is producing an accurate signal without replacing the sensor. Since gauges included in the standard operator display do not provide a sufficiently precise readout of the sensed parameter for this purpose, one method of determining the output would be to display the parameter level being reported by the sensor on a digital display and comparing the displayed level to a measurement reported by a test sensor. For example, if the technician is interested in checking the engine coolant temperature sensor, the technician obtains a reference to which to compare the sensor by measuring coolant temperature with a service tool. By comparing the temperatures reported by the vehicle-mounted sensor and the service tool, the technician can determine whether the vehicle-mounted sensor has failed without spending time replacing the sensor.

Since most machines include a number of sensors but only one or two digital displays, a means for selecting one of the parameters to be displayed digitally must be included. Such a means must also include a way to identify the parameter being displayed so the technician is assured that the parameter of interest has been selected.

Prior art systems, such as that disclosed in U.S. Pat. No. 3,906,437 issued to Brandwein et al. on Sep. 16, 1975, have allowed an operator to select one of a plurality of operating parameters to be displayed in a digital format. However, such a system tends to clutter the appearance of the display since the selection means must be permanently affixed to the front of the display and includes, for example, a rotatable switch knob, a plurality of lines extending from the switch knob to the gauges, and a second rotatable switch knob to select parameters not being illustrated by a gauge. While useful if an operator regularly views the digital information while operating the machine, the permanently affixed means for selecting parameters to view digitally and for identifying the selected parameter are generally unnecessary when such information is only desired by service personnel troubleshooting the system.

The present invention is directed at overcoming one or more of the problems as set forth above.

DISCLOSURE OF THE INVENTION

The invention avoids the disadvantages of known monitoring and diagnostic systems and provides an instrument that is useful in connection with machines for which it is advantageous to selectively display a plurality of sensed parameters in a digital format.

In one aspect of the invention, an apparatus for indicating parameter values on a monitoring system having a normal mode and a numeric readout mode is provided. A switch selects one of the normal mode and the numeric readout mode. A sensor produces a sensor signal. A device displays a number in digital form that is representative of the sensor signal in response to the switch selecting the numeric readout mode. A gauge is provided to display the sensor signal in graphical form in response to the switch selecting the normal mode and to flash an illuminable device in response to the switch selecting the numeric readout mode.

In another aspect of the invention, a method for indicating parameter values on a monitoring system having a normal mode and a numeric readout mode is provided. The method includes the steps of selecting one of the normal mode and the numeric readout mode; sensing a parameter and responsively producing a sensor signal; displaying a number in digital form that is representative of the sensor signal; and displaying the sensor signal in graphical form in response to selecting the normal mode and flashing an illuminable device forming part of the gauge in response to selecting the numeric readout mode.

The invention also includes other features and advantages which will become apparent from a more detailed study of the drawings, specification, and appended claims.

BRIEF DESCRIPTION OF THE DRAWINGS

For a better understanding of the present invention, reference may be made to the accompanying drawings in which.

BEST MODE FOR CARRYING OUT THE INVENTION

Figure 1:
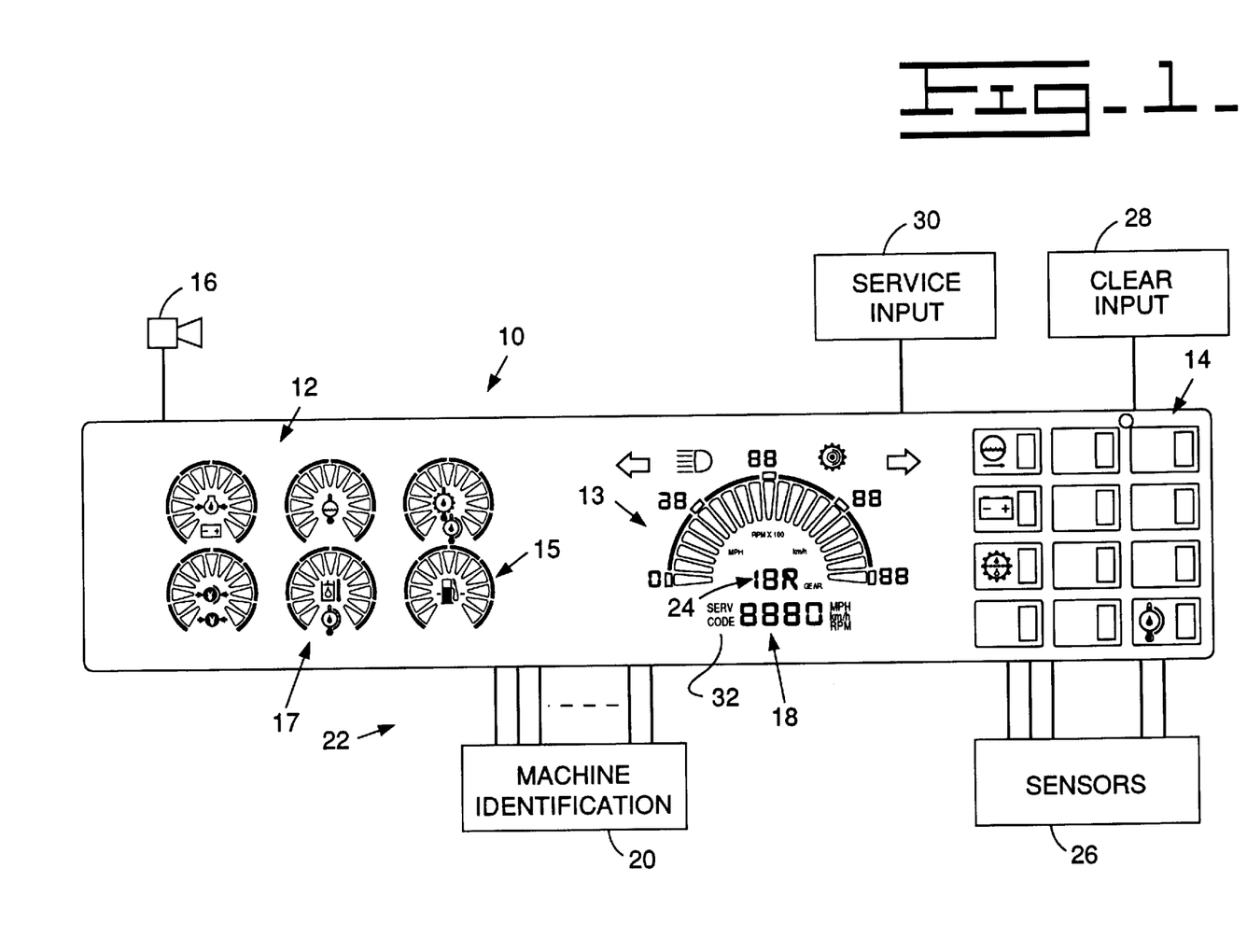
FIG. 1 illustrates a computerized monitoring and diagnostic system.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 is advantageously microprocessor based and functions in response to internal software. The instrument 10 includes a plurality of indicator lights 14, preferably LEDs, and a plurality of electronic gauges 12 having a plurality of illuminable segments, preferably of the vacuum fluorescent (VF) type. Advantageously, the instrument 10 is used in connection with a large work vehicle and is fixedly located in the operator's compartment such that an operator can view the parameter levels and any warning indication produced by the instrument 10.

The gauges 12 preferably indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/ tacho gauge 13 that displays either vehicle speed or engine speed and includes scaling digits for displaying the magnitude of the sensed parameter at various points along the periphery of the speedo/tacho gauge 13. Since the desired scaling digits may be different for each machine, the instrument 10 modifies the scaling digits in response to the machine to which the instrument 10 is connected.

Each gauge, except the central gauge indicating speedo/tacho information, is capable of indicating either a high warning condition or a low warning condition, i.e., sensed parameters being above or below a normal operating range.

Fault conditions are brought to the operator's attention by the indicator lights 14, a flashing gauge, a flashing alarm lamp, and/or a warning horn 16. Advantageously, the indicator lights 14 are illuminated in response to switch-type inputs being in a fault condition being advantageously defined as an open voltage condition. If an input normally associated with a switch-type input is unused on the machine to which the instrument 10 is connected, the indicator light 14 does not indicate a fault condition.

When used in connection with some machines, it is also desirable for the instrument 10 to include turn signal indicators, a hi-beam light indicator, and a retarder indicator for informing the operator that a transmission retarder is engaged, for example, on a large off-highway work vehicle. However, not all machines use all functional indicators. Thus the instrument 10 controllably enables each of the functional indicators needed by the machine to which the instrument 10 is connected. As is the case with the gauges, the functional indicators are also of VF design.

A VF digital display 18 is included to indicate either speedometer or tachometer information in digital form while operating in a normal display mode. In the preferred embodiment, one of the speedo/tacho gauge 13 and digital display 18 indicates speedometer information while the other indicates tachometer information; however, either speedometer or tachometer information may be indicated on both if so desired. Advantageously, the digital display 18 is also adapted to indicate the level of other parameters when the instrument 10 is operating in a numeric readout mode or diagnostic information when the instrument 10 is operating in diagnostic modes.

Each of the gauges 12 other than the speedo/tacho gauge 13 includes a plurality of indicating segments, high warning segments, and low warning segments. However, a single high or low warning segment may be used. The high warning segments are advantageously located in the most clockwise position on the gauge 12 and the low warning segments are located in the most counter-clockwise position on the gauge 12. When it is desirable to indicate the level of a parameter for which it is advantageous to indicate a warning when the parameter exceeds a certain level, for example engine temperature, the high warning segments are enabled. To indicate the level of a parameter for which it is advantageous to indicate a warning when the parameter is below a certain level, for example fuel level, the low warning segments are enabled. In some cases, it is advantageous to indicate both high and low warning conditions.

Advantageously, the gauges 12 also includes a plurality of outline segments 15 including a high outline segment, central outline segments, and a low outline segment, all of which being located around the periphery of each gauge and being illuminable. The high outline segment is located adjacent to the high warning segments and the low outline segment is located adjacent to the low warning segments. The central outline segments are located between the high and low outline segments. The central outline segments are illuminated in response to the gauge 12 being used to indicate the level of a sensed parameter. In response to a parameter having a high warning value being indicated, the high outline segment is illuminated; and in response to a parameter having a low warning value being indicated, the low outline segment is illuminated. Thus, the appearance of the gauge 12 indicates that the displayed parameter has either a high or low warning level and better informs the operator that the level of the sensed parameter is approaching a warning level.

In the preferred embodiment, the high and low warning segments are colored differently than the indicating segments; and the high and low outline segments are colored differently from the central outline segments and similarly to the high and low warning segments. Advantageously, the high and low warning segments and high and low outline segments are red and the indicating segments and central outline segments are blue-green. However, the low warning segments and low outline segment for the gauge 12 indicating fuel level are preferably yellow.

One or more of the gauges include a plurality of illuminable symbols 17 to identify the parameter being indicated. The symbols 17 are advantageously of VF design, blue-green in color, and selected from the symbols approved by ISO for indicating the parameters of interest. One of the symbols 17 is illuminated in connection with each gauge 12 so that the operator can identify the indicated parameter. Thus, the gauge 12 is capable of indicating the level of one of two or more different parameters by illuminating one of the symbols 17. The parameter, and hence symbol 17, selected for each gauge 12 depends on the vehicle to which the instrument 10 is connected and choices made by the vehicle and system designers.

The gauges 12 are capable of displaying the parameter values in a plurality of display modes, including a single-bar mode and a fill-the-graph mode. In the single-bar mode, only one of the indicating segments is illuminated when the level of the sensed parameter is within the normal operating range. Thus, the appearance of the gauge 12 simulates the appearance of a mechanical gauge. In the fill-the-graph mode, the level of the sensed parameter is indicated by illuminating a plurality of indicating segments such that the appearance of the gauge 12 simulates a bar graph.

Advantageously, each machine type has an identification code to be delivered to the instrument 10 which responsively reconfigures itself to conform to the format chosen by the designer for that machine. In response to the identification code, the instrument 10 determines the parameter monitored at each input from the wire harness, the functional indicators to be illuminated, the type of display brightness control to be used, the parameter to be displayed on each gauge, the status report level for each input, the gauges to be used, the data to be transmitted over the communication link to other electronic controls, the signal filtering, debounce, scaling, or averaging characteristics associated with each input, and the functional relationship between each parameter value and the gauge reading. Likewise, the switch-type input associated with each indicator light 14 is defined for each machine type on which the instrument 10 is used in response to the identification code.

An identification means 20 produces the identification code. In the preferred embodiment, the identification means 20 is connected to the instrument 10 via one or more identification lines 22 forming part of the wire harness and carrying the identification code.

In the preferred embodiment, the identification code is in the form of binary signals produced by connecting each of the identification lines 22 to a ground input potential or allowing the voltage of the identification line to float in response to any voltage to which the identification line 22 is connected. In the preferred embodiment, the identification means 20 directly connects the identification lines 22 to a terminal having one of the above described voltage characteristics; however, it should be appreciated that the identification lines 22 could be connected to a switch-type device for connection to a ground input potential or a floating terminal. While the preferred embodiment of the invention is described in connection with a ground input potential and a floating or open voltage condition, it should be appreciated that the particular states of the binary signals could be modified without deviating from the spirit of the invention.

In general, the machine dependent functions and displays described herein are determined in response to the identification code, although other inputs may be used to determine such things as whether the gauges 12 will display in a fill-the-graph or a single-bar mode and whether speed will be displayed in MPH or km/h. Typically, the instrument 10 retrieves a number of identifiers from a memory device (not shown) within the instrument 10 in response to receiving the identification code. The instrument 10 uses the identifiers to determine which functions and displays are to be used in connection with machines having the received identification code.

In addition to the above warning indications, the warning horn 16 or the alarm lamp may be activated when the level of the sensed parameter exceeds the high or low warning value.

A gear display 24 is advantageously disposed adjacent the digital display 18. The gear display 24 indicates the number and direction, i.e. forward, neutral, or reverse, of a vehicle transmission.

The instrument 10 is connected to each of a plurality of sensors 26 by wire. The instrument 10 preferably performs some processing of signals received from the sensors over the wire harness and scales the signals received from pulse-width modulated type sensors and frequency based sensors in manners well-known in the art. Similarly, the instrument 10 receives signals from switch-type sensors. The signals associated with these inputs are received by the instrument 10, but generally no scaling is required.

In the preferred embodiment, the instrument 10 includes a plurality of operating modes for use in normal operation and as a diagnostic tool. The operating modes preferably include the normal display mode, a service mode, a status mode, a tattletale mode, and a numeric readout mode. While in the normal display mode, the instrument 10 displays sensed parameter levels and indicates warning conditions in response to sensed parameters being outside a given range.

The instrument 10 preferably includes terminals for receiving signals from a clear input 28 and a service input 30. A service tool is advantageously included having two single-pole, single-throw (SPST) switches corresponding to the clear input 28 and service input 30. The technician actuates the switches to selectively ground the clear input 28 and service input 30. The service and clear inputs 28,30 are advantageously used by the technician to select the mode of operation for the instrument 10 and to provide commands to the instrument 10 when operating in one or more of the modes of operation. It should be understood, however, that many other devices may be used to select a desired operating mode.

The instrument 10 automatically enters the normal display mode of operation when power is applied. To access other display modes, the service and clear inputs 28,30 are grounded simultaneously. When both inputs 28,30 are grounded, a mode number corresponding to the current operating mode appears on the digital display 18. Preferably, the five operating modes are numbered from 0 through 4. If the service and clear inputs 28,30 both remain grounded for advantageously 2 seconds, the instrument 10 begins scrolling through the modes. When the desired mode is reached, i.e. the mode number corresponding to the desired operating mode is displayed on the digital display 18, the technician locks on to that mode by disconnecting the service and clear inputs 28,30 from ground.

Vital vehicle functions are monitored and reported on the instrument display panel in the normal display mode. The instrument 10 monitors itself and the I/O circuits for status, for intermittent-fault conditions, and for present-fault conditions. If any fault conditions are sensed on diagnosable inputs while in the normal display mode, either from the instrument 10 or from other system modules, a SERV CODE indicator 32 located adjacent the digital display 18 is illuminated. The SERV CODE indicator 32 is thus illuminated to report a detected condition regardless of the present condition of the input, i.e., whether the input is presently in a fault condition or not.

While in the normal display mode, the instrument 10 reads the identification code and responsively retrieves a number of identifiers from a memory device (not shown) within the instrument 10. For each of the gauges other than the speedo/tacho gauge 13, the instrument 10 determines whether the gauge is a high or low warning style gauge. Advantageously, this is determined by retrieving a gauge style identifier from memory within the instrument 12 for each gauge to be used. The gauge style identifier is retrieved from the memory device in response to the identification code. Each of the gauge style identifiers are selected in response to choices made by the vehicle designers regarding which parameters are to be displayed and the preferred display format for each parameter.

If the gauge is a low warning style gauge, the low outline segment is illuminated and the low warning segments are enabled. If the gauge is a high warning style gauge, the high outline segment is illuminated and the high warning segments are enabled.

The instrument 10 reads the sensor signals from the wire harness. Since the sensor signals may be in the form of pulse-width modulated signals, frequency signals, or switch-type binary signals, the instrument 10 converts and scales the inputs to a microprocessor readable form in manners well-known in the art. For example, if the output from one of the pulse-width modulated sensors is sensing oil pressure and has a duty cycle of 70% and the range of the scaled signal is from 0–255, the binary number 179 is assigned to the oil pressure parameter.

In response to the scaled signals from the pulse-width modulated or frequency sensors, the instrument 10 determines which segments are to be illuminated on each gauge. In the preferred embodiment, the memory device (not shown) includes a plurality of stored parameter values corresponding to each possible magnitude of the scaled data for each sensed parameter. The memory device (not shown) also includes a plurality of segment numbers included in a look-up table of a type well-known in the art to indicate the number of segments to be illuminated in response to each of the stored parameter values. The instrument 10 thus maps the parameter value to the number of segments to be illuminated on the associated gauge. Alternatively, an equation could be developed defining the relationship between the parameter values and the segment commands and could be solved in place of the use of the look-up table. Similarly, the scaled data could be mapped directly to the segment numbers.

In the preferred embodiment, the high and low warning segments and indicating segments are numbered, starting with the most counter-clockwise positioned segment and progressing in the clockwise direction, from 0 through 12. In keeping with the above example, suppose that the scaled data retrieved by the instrument and associated with the oil pressure in an engine is 179 and that the oil pressure is to be displayed in the low warning format. The instrument would retrieve for example the parameter value of 125 kPa from the look-up table and would use this value to retrieve the number 6 from another look-up table and segments 2 through 6 would be illuminated if in the fill-the-graph mode. Segments 0 and 1 would not be illuminated or flashed since these segments are only used when parameter level is below the low warning value.

If the gauge 12 includes a plurality of symbols 17, the instrument 10 produces a control signal to illuminate one of the symbols 17 in response to a symbol identifier that is retrieved from the memory device (not shown). In the preferred embodiment, the gauge includes two symbols and the symbol identifier indicates which of the two symbols 17 should be illuminated in response to the parameter assigned to that gauge 12. Since the parameter assignment is made in response to the identification code, the symbol identifier is also advantageously retrieved in response to the identification code.

As an aid to the diagnosis of faulty sensors, the numeric readout mode is included to digitally display the magnitude of sensed parameters. In the preferred embodiment, a number is displayed on the digital display 18 indicating the level of the sensed parameter in engineering units. For example, if the scaled sensor data is 128 and the instrument 10 retrieves 100 kPa from memory as the indicated parameter level for oil pressure, then the digital display 18 indicates the number 100 to represent 100 kPa. In the preferred embodiment, the number displayed for system voltage is equivalent to the sensed voltage multiplied by ten. Thus, if the sensed system voltage is 23.5, the digital display 18 indicates the number 235. Alternatively, the sensor signal is displayed as a percent of the full scale reading of the parameter sensor 26. For example, if the scaled sensor data is 128 and the range of possible values is 0–255, then the digital display 18 indicates the number 50 to represent that the sensor signal is at 50 percent of full scale.

Each parameter is advantageously displayed in engineering units as follows:

| Temperatures | degrees C. |
| Pressures | kPa |
| Speeds | RPM |
| Ground Speed | MPH or km/h |

Parameters are identified by their parameter number which is indicated on the gear display 24, for example, as follows:

| PARAMETER # | PARAMETER |
| --- | --- |
| 0 | Ambient Light Level |
| 1 | Gauge 1 |
| 2 | Gauge 2 |
| 3 | Gauge 3 |
| 4 | Gauge 4 |
| 5 | Gauge 5 |
| 6 | Gauge 6 |
| 7 | Engine Speed |
| 8 | Vehicle Speed |
| 9 | System Voltage | where the gauges 12, other than the speedo/tacho gauge 13 are numbered from left to right, top to bottom starting with the upper left hand gauge such that the upper left hand gauge is known as gauge 1 and the lower right hand gauge is known as gauge 6.

In addition to the parameter number, the parameters associated with the gauges 12, other than the speedo/tacho gauge 13, are identified by flashing the outline segments 15 for the gauge indicating that parameter value. The parameter being displayed by the flashing outline segments 15 is identified by referring to the illuminated symbol 17 corresponding to the parameter being indicated by that gauge. Alternatively, the symbol 17 may also be flashed either independent from or in conjunction with the flashing outline segments 15 when the associated parameter number is selected. When engine speed or ground speed is selected, the correct units label (i.e. RPM, MPH, or km/h) is illuminated to the right of the digital display 18. In the cases of ambient light level and system voltage, the parameter number displayed on the gear display 24 is the only means for identifying the parameter, therefore the technician must refer to a table to correlate the parameter number to the indicated parameter.

Figure 2:
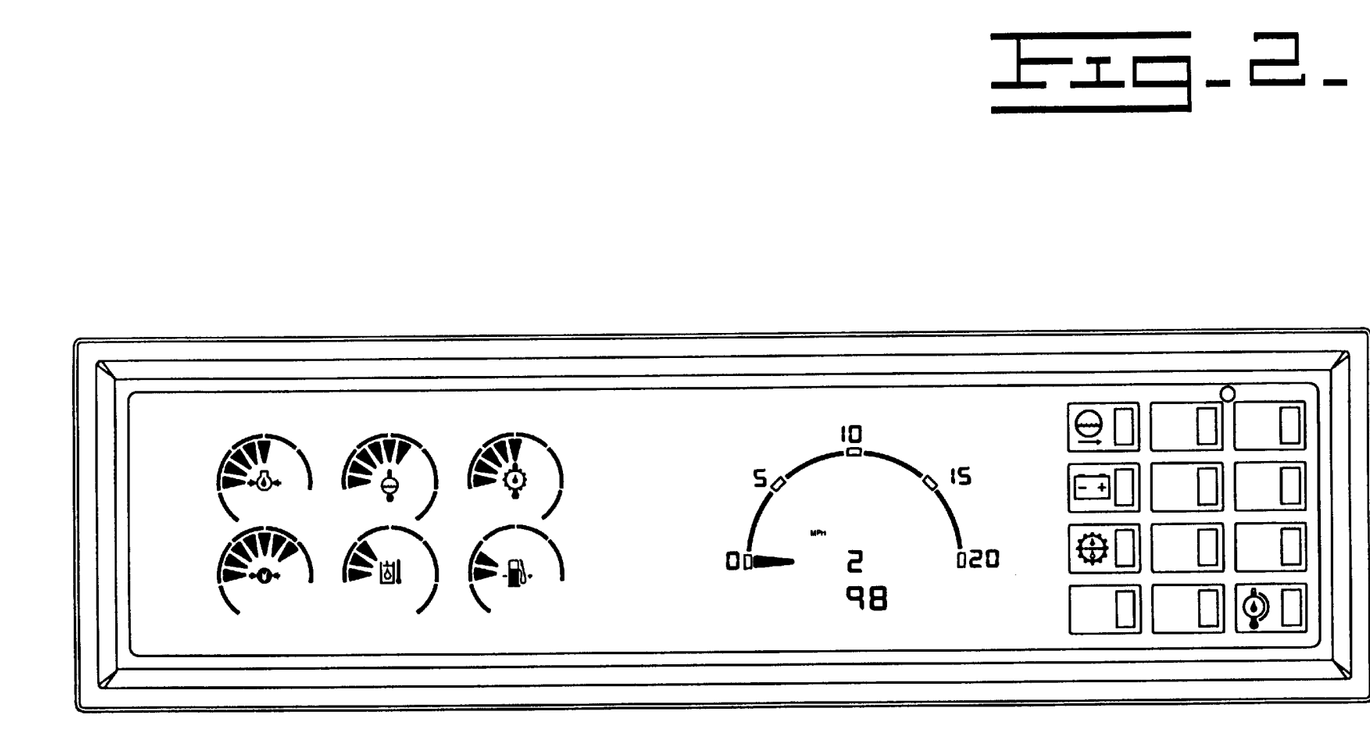
FIG. 2 illustrates the computerized monitoring and diagnostic system functioning in a numeric readout mode.

For example, the instrument 10 functioning in the numeric readout mode is shown in FIG. 2. The speedo/tacho gauge 13 is displaying speedometer information in MPH. The engine coolant temperature is displayed by the digital display 18 as 98 degrees Celsius, the gear display 24 is indicating gauge 2, and the outline segments 15 for the top center gauge, i.e. gauge 2, are flashed. Advantageously, the gauge outline segments 15 of the selected gauge are flashed at a 1 Hz rate.

Upon entering the numeric readout mode, the gear display 24 indicates parameter 0, which preferably corresponds to ambient light level. When the service input 30 is grounded, the gear display 24 begins scrolling through the parameters. By ungrounding the service input 30, the instrument 10 is "locked onto" a given parameter. The numeric readout mode is exited by simultaneously grounding both the service input 30 and the clear input 28 for advantageously 2 seconds.

In the preferred embodiment, the parameter levels being displayed in graphical form on the gauges 12 while in the normal display mode are also displayed in graphical form in the numeric readout mode. The indicating segments to be illuminated and the warning levels are established as described above in connection with the normal display mode. Thus the technician is able to view all of the parameters in graphical form in addition to being able to view each of the parameters in digital form by scrolling and/or "locking onto" each of the parameters individually. Any parameter that is not used by the machine or for which a sensor signal is not being received is displayed as a zero on the digital display 18 when the corresponding parameter number is being displayed on the gauge display 24.

Figure 3A:
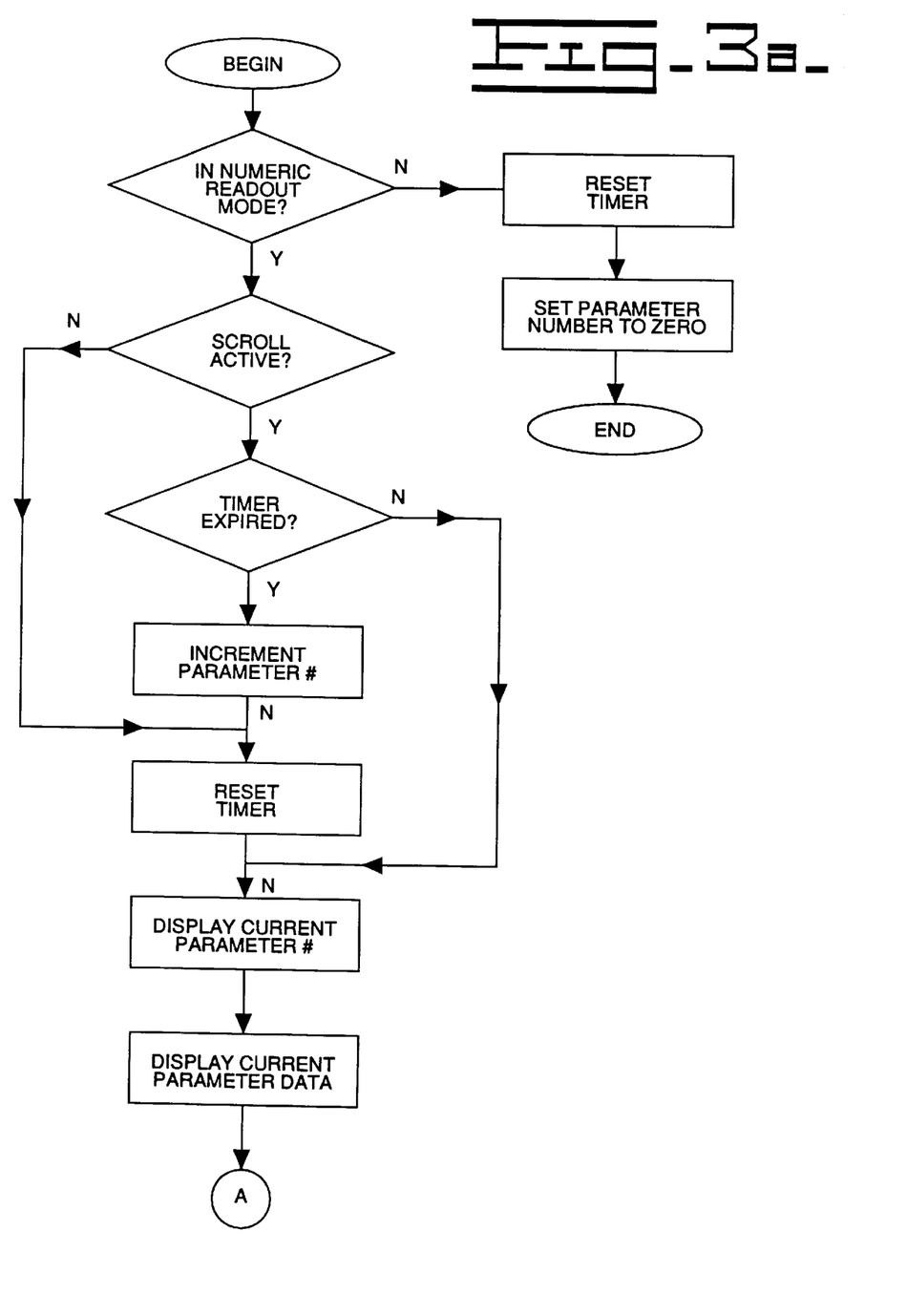
FIGS. 3a and 3b illustrate a flow chart of an algorithm executed in connection with a preferred embodiment of the invention.
Figure 3B:
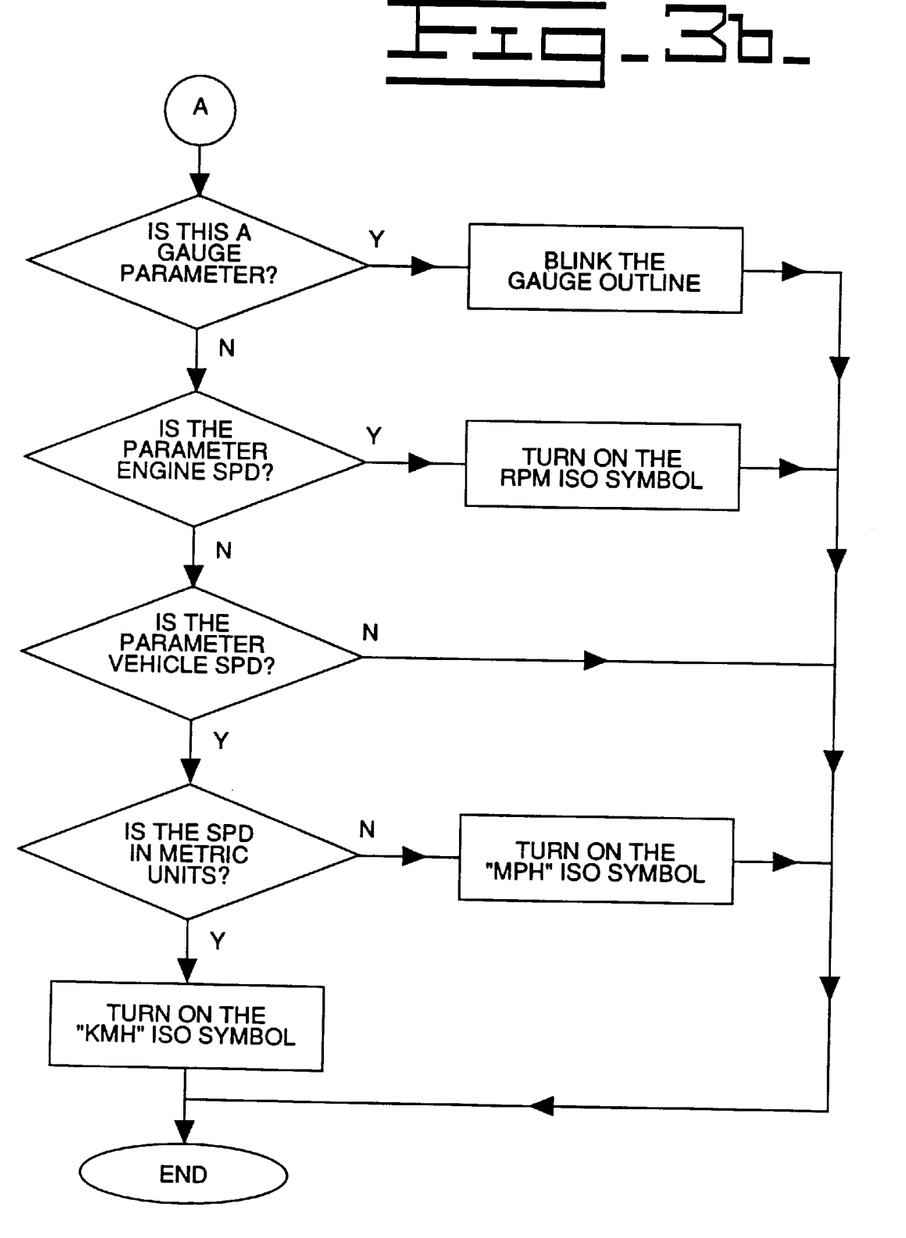

In the preferred embodiment, the instrument 10 executes the algorithm illustrated in FIGS. 3a and 3b. The instrument 10 reads the service and clear inputs 28,30 and in response to receiving a grounded signal on both of the service and clear inputs 28,30, the instrument 10 individually produces commands to display the mode numbers on the digital display 18 for a predefined length of time. When the service and clear inputs 28,30 are removed from ground potential while the instrument is producing the command to display the mode number corresponding to the numeric readout mode, the instrument 10 begins operating in the numeric readout mode.

If the instrument 10 is not in the numeric readout mode, a timer is reset to zero and the parameter number is set to zero in the memory device within the instrument 10. If the instrument 10 is operating in the numeric readout mode, the instrument 10 determines whether the parameter numbers should be scrolled by reading the service input 30.

If the service input is not grounded, the timer is reset to zero and the instrument 10 produces a command to display the current parameter number on the gear display 24. If the service input 30 is grounded, the timer is checked to determine whether it has exceeded a predefined maximum. If the timer has exceeded the predefined maximum, the parameter number is increased by one, the timer is reset to zero, and the instrument 10 causes the current parameter number to be displayed on the gear display 24. If the predefined maximum has not been exceeded, the instrument 10 produces a command to display the current parameter number on the gear display 24.

Since the memory device includes identifiers assigning one of the sensed parameters to each of the gauges 12 used on each machine to which the instrument 10 may be connected, the instrument 10 determines which parameter is assigned to each gauge 12 by retrieving the identifiers for that machine from memory in response to the identification code. Also in response to the identification code, the inputs are defined for the parameters to be displayed in the numeric readout mode but which are not assigned to one of the gauges 12. Similarly, a symbol 17 is also illuminated for each of the used gauges 12 in response to the symbol identifier retrieved from memory in response to the identification code, as set forth above in connection with the normal display mode.

The instrument 10 reads all of the sensor inputs and graphically displays each of the parameters assigned to the gauges 12. The segments illuminated on each gauge is determined by scaling the sensor signal, retrieving a parameter value in engineering units from memory in response to the scaled sensor signal, and retrieving a segment number from memory in response to the parameter value which is representative of the number of gauge segments to be illuminated, as described above in connection with the normal display mode.

The level of the parameter corresponding to the currently displayed parameter number is displayed digitally on the digital display 18. In one embodiment, the parameter value in engineering units that was retrieved from memory in response to the scaled sensor data is displayed; whereas in another embodiment, the scaled sensor signal is divided by a full scale value. The instrument 10 then causes the digital display 18 to indicate the value of this ratio and thus indicate the percent of full scale being indicated by the sensor.

If the currently displayed parameter number corresponds to one of gauges 1 through 6, the instrument 10 produces a signal to flash the outline segments 15 of the selected gauge at preferably 1 Hz. Alternatively, the instrument 10 may also produce a command to flash the symbol 17. If the parameter number corresponds to engine speed, the RPM symbol is displayed to the right of the digital display 18.

If the currently displayed parameter number corresponds to vehicle speed, the instrument reads an English/metric programming input (not shown) to determine whether the MPH or km/h symbol is to be illuminated to the right of the digital display 18. Advantageously, the instrument 10 illuminates the MPH symbol in response to the English/metric input being in an open or floating voltage condition, and illuminates the km/h symbol in response to the English/metric input being grounded.

Industrial Applicability

The operation of a preferred embodiment of the present invention is best described in connection with a computerized monitoring and diagnostic system. In the preferred embodiment, the instrument 10 includes a plurality of operating modes for use in displaying parameter values and as a diagnostic tool. The operating modes preferably include a normal display mode, a service mode, a status mode, a tattletale mode, and a numeric display mode.

As an aid to the diagnosis of faulty sensors, the numeric readout mode is included to digitally display the magnitude of sensed parameters. In the preferred embodiment, a number is displayed on the digital display 18 indicating the level of the sensed parameter in engineering units. Alternatively, the sensor signal is displayed as a percent of the full scale reading of the parameter sensor 26.

The instrument 10 includes terminals for receiving signals from a clear input and a service input. The service and clear inputs are used to select the mode of operation for the instrument 10 and to provide commands to the instrument 10 when operating in one or more of the modes of operation.

The instrument 10 automatically enters the normal display mode when power is applied. To access other display modes, the technician grounds the service and clear inputs simultaneously. When both inputs are grounded, a mode number corresponding to the current operating mode appears on the digital display. If both inputs remain grounded for advantageously 2 seconds, the instrument 10 begins sequencing through the modes. When the desired mode is reached, i.e. the mode number corresponding to the desired operating mode is displayed on the digital display 18, the technician locks on to that mode by disconnecting the service and clear inputs 28,30 from ground.

To enter the numeric readout mode while scrolling through the functional modes for the instrument 10, the service and clear inputs 28,30 are disconnected from ground potential when the mode number corresponding to the numeric readout mode is displayed. The parameters are then scrolled by grounding the service input 30 until the desired parameter number is displayed by the gear display 24. The technician then disconnects the service input from ground potential to "lock onto" the displayed parameter number. The level of the selected parameter is displayed in digital form on the digital display 18 either in engineering units or as a percentage of the full scale sensor reading. If the selected parameter corresponds to one of the parameters displayed on gauges 1 through 6, the outline segment 15 for that gauge is flashed. Each of the symbols 17 identifying the parameters being displayed on the gauges 12 is also illuminated. If either engine speed or vehicle speed is selected, the appropriate unit identifier is illuminated to the right of the digital display 18.

By using the numeric readout mode, the technician can precisely determine the parameter level and/or effectively troubleshoot sensors suspected of producing erroneous signals. If, for example, it is desired to know the engine oil pressure at a specific engine speed, it can be displayed directly in kPa by way of the numeric readout mode. As another example, assume that there is a suspicion about the accuracy of the transmission temperature sensor. In the numeric readout mode the temperature can be displayed in degrees Celsius for comparison with a certified temperature measurement.

Any specific values used in the above descriptions should be viewed as exemplary only and not as limitations. Other aspects, objects, and advantages of this invention can be obtained from a study of the appended claims.

We claim:

1. An apparatus for indicating parameter values on a monitoring system having a normal mode and a numeric readout mode, comprising:

switch means for selecting one of said normal mode and said numeric readout mode;

a sensor means for sensing a parameter and responsively producing a sensor signal;

means for receiving said sensor signal and displaying a number in digital form being representative of said sensor signal in response to said switch means selecting said numeric readout mode; and gauge means for displaying said sensor signal in graphical form in response to said switch means selecting said normal mode and for flashing an illuminable device in response to said switch means selecting said numeric readout mode.

2. An apparatus, as set forth in claim 1, including a plurality of said gauge means, a plurality of said sensor means, and means for selecting one of said plurality of gauge means and one of said plurality of sensor means and responsively displaying the sensor signal from the selected sensor means in digital form and flashing an outline segment on the selected gauge means in response to said switch means selecting said numeric readout mode.

3. An apparatus, as set forth in claim 2, including means for illuminating an illuminable symbol in response to said switch means selecting said numeric readout mode.

4. An apparatus, as set forth in claim 1, including a plurality of said gauge means, a plurality of said sensor means, and means for selecting one of said plurality of gauge means and one of said plurality of sensor means and responsively displaying the sensor signal from the selected sensor means in digital form and illuminating an illuminable symbol on the selected gauge means in response to said switch means selecting said numeric readout mode.

5. An apparatus, as set forth in claim 1, wherein said means for receiving said sensor signal and responsively displaying a number being representative of said sensor signal in digital form displays a number being substantially equivalent to the level of the sensed parameter in engineering units.

6. An apparatus, as set forth in claim 1, wherein said means for receiving said sensor signal and responsively displaying a number being representative of said sensor signal in digital form displays a number being substantially equivalent to the ratio of the sensor signal to the full scale reading of the sensor signal whereby the level of the sensor signal is expressed as a percentage of full scale.

7. An apparatus for indicating parameter values on a monitoring system having a normal mode and a numeric readout mode, comprising:

first switch means for selecting one of said normal mode and said numeric readout mode;

a plurality of sensor means for sensing parameter levels and responsively producing sensor signals;

a plurality of gauge means for displaying said sensor signals in graphical form and having an illuminable device, each of said gauge means corresponding to one of said plurality of sensor means, second switch means for selecting one of said plurality of sensor means;

means for receiving the selected sensor signal and displaying a number in digital form being representative of said sensor signal;

means for indicating one of a plurality of display identifiers in response to said second switch means selecting one of said plurality of sensor means and said first switch means selecting said numeric readout mode, each of said plurality of display identifiers corresponding to one of said plurality of sensor means, said plurality of display identifiers being greater in number than said plurality of gauge means; and means for flashing said illuminable device in response to said second switch means selecting one of said plurality of sensor means corresponding to one of said gauge means.

8. An apparatus, as set forth in claim 7, wherein said illuminable device is an outline segment.

9. An apparatus, as set forth in claim 8, wherein said plurality of sensor means includes an engine speed sensor and a ground speed sensor and including an engine speed identifier, a ground speed identifier, and means for illuminating said engine speed identifier and said ground speed identifier in response to said second switch means selecting said engine speed sensor and said ground speed sensor, respectively.

10. An apparatus, as set forth in claim 7, wherein said illuminable device is an illuminable symbol.

11. An apparatus, as set forth in claim 7, wherein said means for receiving the selected sensor signal and responsively displaying a number being representative of said sensor signal in digital form displays a number being substantially equivalent to the level of the sensed parameter in engineering units.

12. An apparatus, as set forth in claim 7, wherein said means for receiving the selected sensor signal and responsively displaying a number being representative of said sensor signal in digital form displays a number being substantially equivalent to the ratio of the sensor signal to the full scale reading of the sensor signal whereby the level of the sensor signal is expressed as a percentage of full scale.

13. A method for indicating parameter values on a monitoring system having a normal mode and a numeric readout mode, comprising the steps of:

selecting one of the normal mode and the numeric readout mode;

sensing a parameter and responsively producing a sensor signal;

displaying a number in digital form being representative of the sensor signal in response to selecting the numeric readout mode; and displaying the sensor signal in graphical form in response to selecting the normal mode and flashing an illumin able device forming part of a gauge in response to selecting the numeric readout mode.

14. A method, as set forth in claim 13, including the steps of selecting one of a plurality of gauges and one of a plurality of sensors and responsively displaying the sensor signal from the selected sensor in digital form and flashing an outline segment on the selected gauge in response to selecting the numeric readout mode.

15. A method, as set forth in claim 13, including the steps of:

selecting one of a plurality of sensors producing sensor signals; and indicating a display identifier in response to the selected sensor and wherein the step of displaying a number being representative of the sensor signal in digital form includes the step of displaying a number in digital form being representative of the sensor signal produced by the selected sensor.

* * * * *